(12) United States Patent
Coppola et al.

(10) Patent No.: US 12,424,892 B2
(45) Date of Patent: Sep. 23, 2025

(54) STABILIZED CORE ASSEMBLY FOR CARBON FIBER SLEEVED ELECTRIC MOTOR ROTOR

(71) Applicant: GM GLOBAL TECHNOLOGY OPERATIONS LLC, Detroit, MI (US)

(72) Inventors: Anthony Michael Coppola, Rochester Hills, MI (US); Derek Frei Lahr, Ann Arbor, MI (US); Alireza Fatemi, Canton, MI (US); Erik Brandon Golm, Sterling Heights, MI (US); Alan G. Holmes, Clarkston, MI (US); Michael B. Viola, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 347 days.

(21) Appl. No.: 18/100,896

(22) Filed: Jan. 24, 2023

(65) Prior Publication Data

US 2024/0250569 A1 Jul. 25, 2024

(51) Int. Cl.
| | |
|---|---|
| *H02K 1/276* | (2022.01) |
| *H02K 1/04* | (2006.01) |
| *H02K 1/27* | (2022.01) |
| *H02K 1/30* | (2006.01) |
| *H02K 15/12* | (2025.01) |

(52) U.S. Cl.
CPC ............. *H02K 1/30* (2013.01); *H02K 1/04* (2013.01); *H02K 1/27* (2013.01); *H02K 2201/09* (2013.01)

(58) Field of Classification Search
CPC .... H02K 1/276; H02K 1/2766; H02K 1/2753; H02K 1/274; H02K 1/272; H02K 1/2706; H02K 1/27; H02K 1/04; H02K 1/30; H02K 1/28; H02K 2201/09; H02K 15/00; H02K 15/02; H02K 15/0273; H02K 15/03;

(Continued)

(56) References Cited

U.S. PATENT DOCUMENTS

| | | | | |
|---|---|---|---|---|
| 3,802,068 A | * | 4/1974 | Scott ................... | H02K 15/023 29/598 |
| 4,027,229 A | * | 5/1977 | Frink ................... | H02K 21/028 322/50 |

(Continued)

FOREIGN PATENT DOCUMENTS

| | | | | |
|---|---|---|---|---|
| CN | 107530927 A | * | 1/2018 | ......... B29C 45/0046 |
| CN | 114498977 A | * | 5/2022 | |

(Continued)

OTHER PUBLICATIONS

U.S. Appl. No. 17/537,123, filed Nov. 29, 2021, Coppola et al.
U.S. Appl. No. 17/977,068, filed Oct. 31, 2022, Coppola et al.

*Primary Examiner* — Edgardo San Martin

(57) ABSTRACT

The present disclosure includes a rotor core assembly for an electric motor. The rotor core assembly includes a plurality of laminations secured together. A center bore is defined by the plurality of laminations. A longitudinal axis of the rotor core assembly extends along an axial center of the center bore. A carbon fiber sleeve surrounds the plurality of laminations. Magnet slots are defined by the plurality of laminations. The magnet slots extend parallel to the longitudinal axis. Magnets are seated in the magnet slots. Reinforcing bores are defined by, and extend across, the plurality of laminations. Reinforcing members are seated in the reinforcing bores.

19 Claims, 10 Drawing Sheets

(58) Field of Classification Search
CPC .... H02K 15/035; H02K 15/12; H02K 15/121; H02K 15/123
See application file for complete search history.

(56) References Cited

U.S. PATENT DOCUMENTS

| | | | | |
|---|---|---|---|---|
| 4,864,176 | A * | 9/1989 | Miller | H02K 19/20 |
| | | | | 310/194 |
| 11,133,724 | B2 * | 9/2021 | Lahr | H02K 1/276 |
| 11,742,734 | B2 * | 8/2023 | Martin | H02K 21/16 |
| | | | | 310/156.01 |
| 11,876,409 | B2 * | 1/2024 | Fatemi | H02K 1/2766 |
| 11,916,446 | B2 * | 2/2024 | Coppola | H02K 15/028 |
| 12,015,331 | B2 * | 6/2024 | Fatemi | H02K 9/20 |
| 12,062,946 | B2 * | 8/2024 | Fatemi | H02K 1/32 |
| 12,088,146 | B2 * | 9/2024 | Fatemi | H02K 5/128 |
| 12,126,219 | B2 * | 10/2024 | Martin | H02K 1/276 |
| 12,155,266 | B2 * | 11/2024 | Coppola | H02K 15/03 |
| 2024/0113582 | A1 * | 4/2024 | Ishihara | H02K 7/116 |

FOREIGN PATENT DOCUMENTS

| | | | | |
|---|---|---|---|---|
| DE | 102009046716 A1 * | 5/2011 | ........... | H02K 1/2766 |
| DE | 102017111955 A1 * | 12/2018 | | |
| DE | 102021213697 A1 * | 6/2023 | ........... | H02K 1/2766 |
| KR | 20180065338 A * | 6/2018 | | |
| WO | WO-2024033054 A1 * | 2/2024 | | |

\* cited by examiner

STABILIZED CORE ASSEMBLY FOR CARBON FIBER SLEEVED ELECTRIC MOTOR ROTOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a stabilized core assembly for a carbon fiber sleeved electric motor rotor.

Electric motors include a rotor and a stator. The rotor rotates within the stator. The rotor includes a core, which is formed of a plurality of laminations. The laminations are thin metal sheets that are stacked and secured together. The laminations define a center bore in which a rotor shaft is inserted. The rotor shaft is supported by bearings, which allow the rotor to rotate about its axis.

SUMMARY

In various features, the present disclosure includes a rotor core assembly for an electric motor. The rotor core assembly includes a plurality of laminations secured together. A center bore is defined by the plurality of laminations. A longitudinal axis of the rotor core assembly extends along an axial center of the center bore. A carbon fiber sleeve surrounds the plurality of laminations. Magnet slots are defined by the plurality of laminations. The magnet slots extend parallel to the longitudinal axis. Magnets are seated in the magnet slots. Reinforcing bores are defined by, and extend across, the plurality of laminations. Reinforcing members are seated in the reinforcing bores.

In additional features, the reinforcing members include rods mounted with retention members at opposite ends thereof to compress the plurality of laminations together.

In additional features, the reinforcing members include strips of polymeric material extending through the reinforcing bores.

In additional features, the magnet slots include a polymeric filler.

In additional features, the assembly includes a first end ring and a second end ring, the plurality of laminations are between the first end ring and the second end ring.

In additional features, at least one of the first end ring and the second end ring defines an inlet and a manifold extending from the inlet, the manifold configured to direct the polymeric filler from the inlet into at least one of the magnet slots and the reinforcing bores.

In additional features, the manifold of the first end ring is configured to direct the polymeric filler to between the first end ring and a first one of the plurality of laminations to bond the first end ring to the first one of the plurality of laminations.

In additional features, the polymeric filler at least partially covers a top one of the plurality of laminations and a bottom one of the plurality of laminations.

In additional features, the polymeric filler defines a cooling channel extending through the magnet slots.

In additional features, an outer polymeric coating is on outer surfaces of the plurality of laminations between the plurality of laminations and the carbon fiber sleeve.

In additional features, the outer polymeric coating extends into slots at the outer surfaces of the plurality of laminations.

In additional features, an inner polymeric coating is on inner surfaces of the plurality of laminations at the center bore.

In additional features, the inner polymeric coating extends into slots at the inner surfaces of the plurality of laminations.

In additional features, the plurality of laminations include alternating tabbed laminations and tabless laminations, the tabbed laminations include tabs at at least one of the magnet slots and the center bore that are folded over the tabless laminations.

In various features, the present disclosure includes a rotor core assembly for an electric motor. The rotor core assembly includes a plurality of laminations secured together. A center bore is defined by the plurality of laminations. A longitudinal axis of the rotor core assembly extends along an axial center of the center bore. A carbon fiber sleeve surrounds the plurality of laminations. Magnet slots are defined by the plurality of laminations. The magnet slots extend parallel to the longitudinal axis. Magnets are seated in the magnet slots. A polymeric filler is within the magnet slots adjacent to the magnets. An outer polymeric coating is on outer surfaces of the plurality of laminations between the plurality of laminations and the carbon fiber sleeve. An inner polymeric coating is on inner surfaces of the plurality of laminations at the center bore.

In additional features, the assembly includes a first end ring and a second end ring. The plurality of laminations are between the first end ring and the second end ring. At least one of the first end ring and the second end ring defines an inlet and a manifold extending from the inlet. The manifold is configured to direct the polymeric filler from the inlet into the magnet slots.

In additional features, reinforcing bores are defined by, and extend through, the plurality of laminations; and reinforcing members are seated in the reinforcing bores.

In additional features, the reinforcing members include reinforcing rods, and the reinforcing bores are connected to the magnet slots.

In various features, the present disclosure includes a rotor core assembly for an electric motor. The assembly includes a plurality of laminations secured together, a first end ring, and a second end ring. The plurality of laminations are between the first end ring and the second end ring. Reinforcing bores are defined by, and extend through, the plurality of laminations. Reinforcing members are seated in the reinforcing bores. A center bore is defined by the plurality of laminations. A longitudinal axis of the rotor core assembly extends along an axial center of the center bore. A carbon fiber sleeve surrounds the plurality of laminations. Magnet slots are defined by the plurality of laminations. The magnet slots extend parallel to the longitudinal axis. Magnets are seated in the magnet slots. A polymeric filler is within the magnet slots adjacent to the magnets. An outer polymeric coating is on outer surfaces of the plurality of laminations between the plurality of laminations and the carbon fiber sleeve. An inner polymeric coating is on inner surfaces of the plurality of laminations at the center bore. At least one of the first end ring and the second end ring defines an inlet and a manifold extending from the inlet, the manifold configured to direct the polymeric filler from the inlet into the magnet slots.

In additional features, the reinforcing members are rods fastened to the first end ring and the second end ring.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
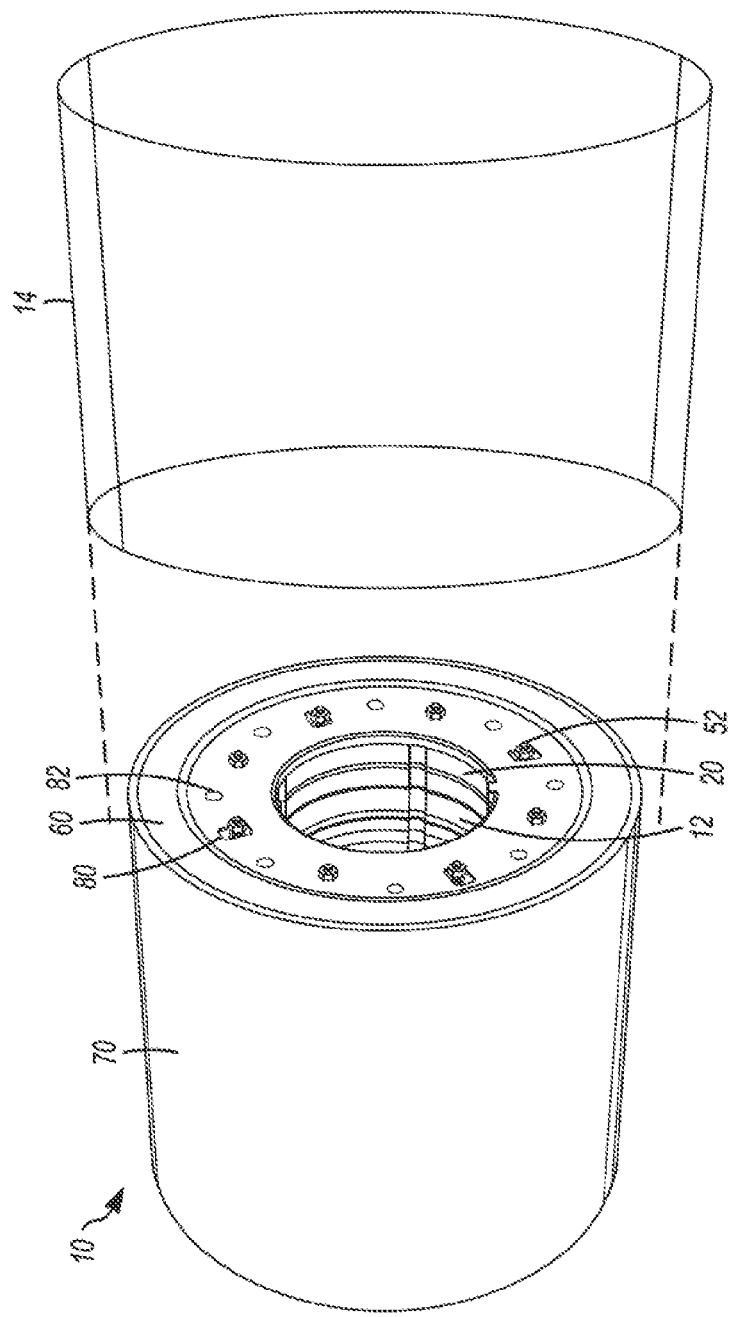
FIG. 1 is an exploded view of a rotor core assembly in accordance with the present disclosure.

FIG. 1 illustrates a rotor core assembly 10 in accordance with the present disclosure for an electric motor. The rotor core assembly 10 is configured to be mounted on a shaft, which is supported by bearings. The rotor core assembly 10 is configured to rotate within a stator of the electric motor. The rotor core assembly 10 generally includes a core 12 and a carbon fiber sleeve 14. The carbon fiber sleeve 14 is press-fit onto the core 12 and exerts pressure onto the core 12. The carbon fiber sleeve 14 reinforces the core 12 by holding components of the core 12 in place at high rotational speeds. As described herein, the core 12 is reinforced in accordance with the present disclosure to allow the carbon fiber sleeve 14 to be press-fit onto the core 12 before a rotor shaft is inserted into the core 12. The rotor shaft is secured within the core 12 by way of a press-fit, for example.

Figure 2:
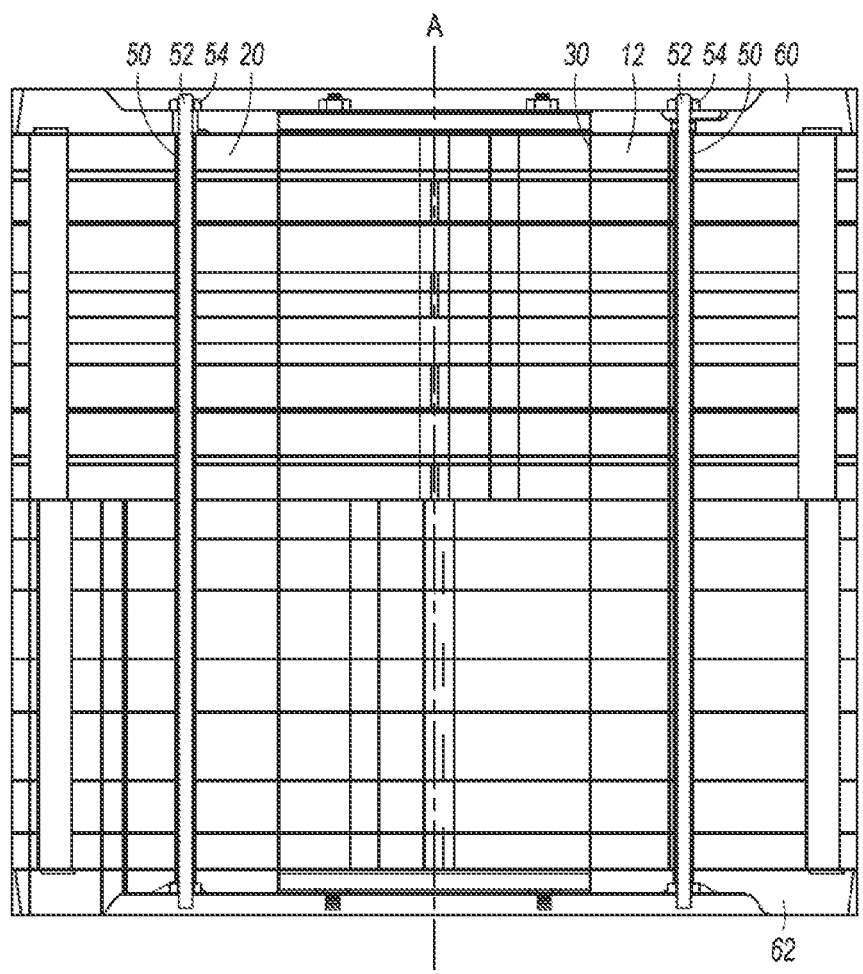
FIG. 2 is a cross-sectional view of a core of the assembly of FIG. 1.

With continued reference to FIG. 1, and additional reference to FIG. 2, the core 12 includes a plurality of laminations 20. The laminations 20 may be made of any suitable material. For example, the laminations 20 may be made of steel with a thin coating of oxide or other surface material configured to suppress electrical currents between the laminations 20. The laminations 20 may be about 0.2 mm-0.3 mm thick, or have any other suitable thickness. The laminations 20 are secured together in any suitable manner, such as with an adhesive or any suitable mechanical interlock. For example, the laminations 20 may include small tabs that extend into cooperation with adjacent laminations 20.

When stacked and secured together, the laminations 20 define a center bore 30. A longitudinal axis A (FIG. 2) of the core 12 extends through an axial center of the center bore 30. The rotor shaft of the electric motor is seated within the center bore 30. The core 12 and the overall rotor core assembly 10 rotates about the longitudinal axis A within the stator of the electric motor.

Figure 3:
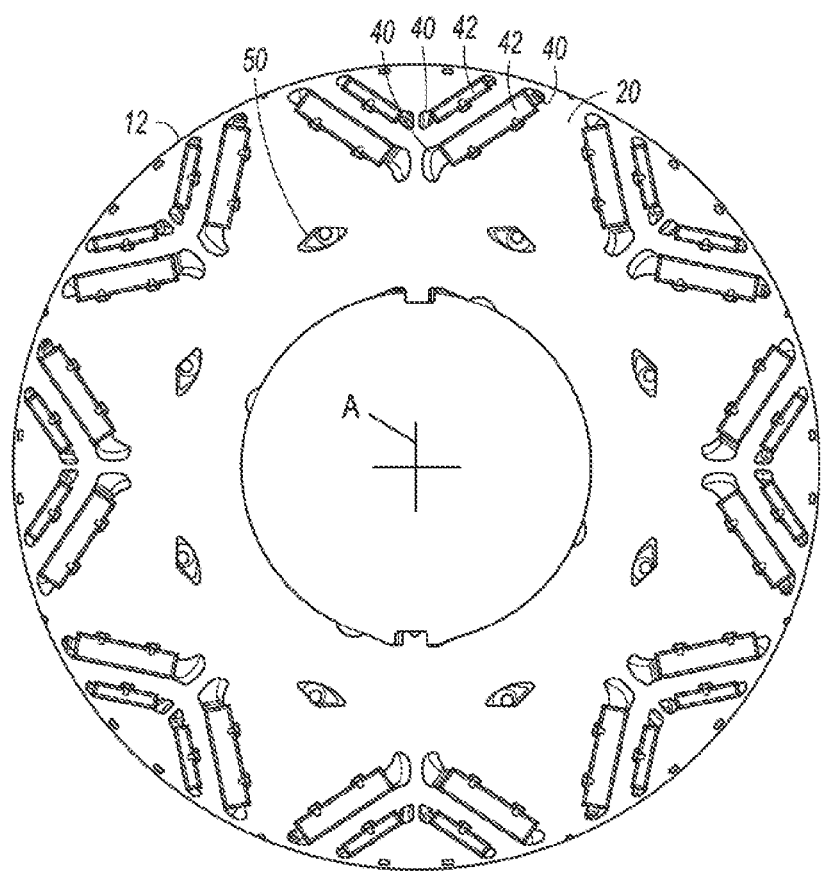
FIG. 3 is another cross-sectional view of the core of the assembly of FIG. 1.
Figure 4:
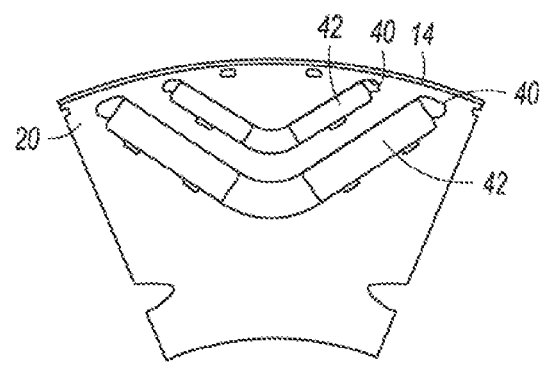
FIG. 4 illustrates exemplary magnetic slots and magnets of the core of the assembly of FIG. 1.

With additional reference to FIGS. 3 and 4, each one of (or a majority of) the laminations 20 define magnet slots 40. The magnet slots 40 thus extend along the core 12. The magnet slots 40 extend parallel to, or generally parallel to, the longitudinal axis A. The magnet slots 40 may be oriented in any suitable manner, such as in groups arranged around the longitudinal axis A. Each group may include multiple magnet slots 40 arranged in a V-shaped configuration, for example.

Magnets 42 are seated in the magnet slots 40. The magnets 42 extend across the laminations 20 parallel to, or generally parallel to, the longitudinal axis A. Aligned magnet slots 40 may include a single magnet 42 extending the length of the core 12. Alternately, aligned magnet slots 40 may include a plurality of individual magnets 42 aligned in a direction parallel to the longitudinal axis A.

With continued reference to FIGS. 2 and 3, for example, the laminations 20 further define reinforcing bores 50. Each one of (or a majority of) the laminations 20 define the reinforcing bores 50. The reinforcing bores 50 extend parallel to, or generally parallel to, the longitudinal axis A. In the example illustrated, the reinforcing bores 50 extend across an entire length of the core 12. In the example illustrated, the reinforcing bores 50 are inboard of the magnet slots 40. In other applications, however, the reinforcing bores 50 may be arranged outboard of the magnet slots 40. In some applications, the reinforcing bores 50 may be connected to, or integral with, the magnet slots 40.

Seated within the reinforcing bores 50 are any suitable reinforcing members configured to provide the core 12 with additional stability and maintain a clamping force on the laminations 20. In the example of FIGS. 1-3, the reinforcing members are configured as reinforcing rods 52. The reinforcing rods 52 are made of any suitable material, such as any suitable non-magnetic material. Suitable materials include, but are not limited to, the following: glass-fiber composite; aluminum; non-magnetic stainless steel, etc. The reinforcing rods 52 may be overmolded with any suitable polymeric compound.

The reinforcing rods 52 are anchored at opposite ends of the core 12 with retention members 54, or in any other suitable manner. The retention members 54 may be any suitable retention ring or nut, for example, configured to cooperate with threads of the rods 52. The reinforcing rods 52 may be anchored to laminations 20 at opposite ends of the core 12. Alternatively, and as illustrated in FIG. 2, the reinforcing rods 52 may be anchored to a first end ring 60 at a first end of the core 12 and a second end ring 62 at a second end of the core 12. The reinforcing rods 52 are anchored at opposite ends to provide a degree of tension on the laminations 20 in a direction parallel to the longitudinal axis A. The reinforcing rods 52 may be removed after the rotor core assembly 10 is press-fit onto the rotor shaft, thereby allowing the bores 50 to be repurposed as oil passages or cooling channels, for example.

Figure 5:
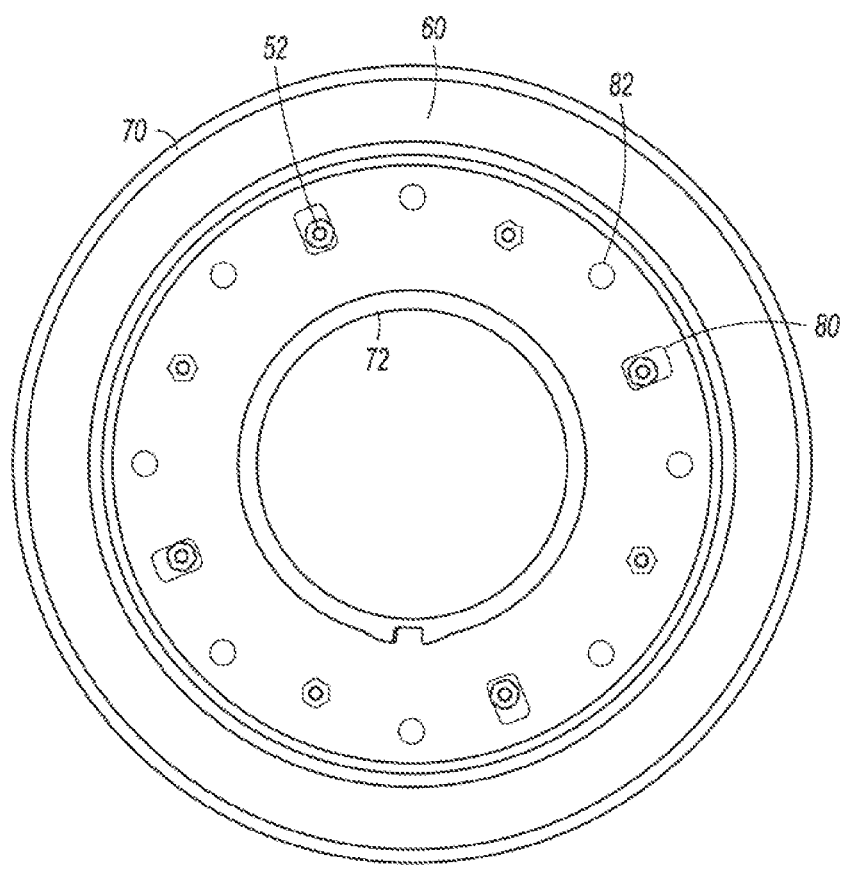
FIG. 5 is an end view of the core of the assembly of FIG. 1.

With reference to FIGS. 1 and 5, for example, the rotor core assembly 10 may also be reinforced with polymeric coatings on outer and/or inner surfaces of the core 12. FIGS. 1 and 5 illustrate an outer polymeric coating 70 and an inner polymeric coating 72. The outer polymeric coating 70 extends around an exterior of the core 12 between the carbon fiber sleeve 14 and the laminations 20. The inner polymeric coating 72 extends around an interior of the center bore 30. The outer polymeric coating 70 and the inner polymeric coating 72 reinforce and strengthen the core 12 and the laminations 20 thereof to help the laminations 20 withstand pressure exerted thereon by the carbon fiber sleeve 14. The outer and inner polymeric coatings 70, 72 may also be applied such that the coatings 70, 72 seep between the laminations 20 to further secure the laminations 20 together.

The outer and inner polymeric coatings 70, 72 may be bonded directly to inner and outer surfaces of the laminations 20 respectively. Alternatively, the outer and the inner polymeric coatings 70, 72 may be bonded to the laminations 20 by way of a primer. The primer may be a silane- or epoxy-based primer, for example. The outer and inner polymeric coatings 70, 72 may include any suitable thermoplastic material, such as, but not limited to, the following: polybezimidazole; polytetrafluoroethylene; polyoxymethylene, etc. The outer and/or inner polymeric coatings 70, 72 may include a low friction outer layer to facilitate insertion of the core 12 into the carbon fiber sleeve 14, and insertion of the rotor shaft into the center bore 30. The low friction layer may include any suitable thermoset material, such as, but not limited to, the following: epoxy; phenolic; polyurethane, etc. The outer and/or inner polymeric coatings 70, 72 may also include any suitable graphite, wax, ceramic, or other suitable lubricating additive. The outer and/or inner polymeric coatings 70, 72 may include any suitable magnetic material to increase the overall magnetic content of the rotor core assembly 10. The outer and/or inner polymeric coatings 70, 72 have a compressive strength of 50 MPa, and a thermal expansion coefficient of less than 30 ppm/C, for example. The outer and/or inner polymeric coatings 70, 72 may have any suitable thickness, such as 50-200 μm, for example. The outer and/or inner polymeric coatings 70, 72 may be machined to a smooth surface with a tight tolerance by grinding.

Figure 6:
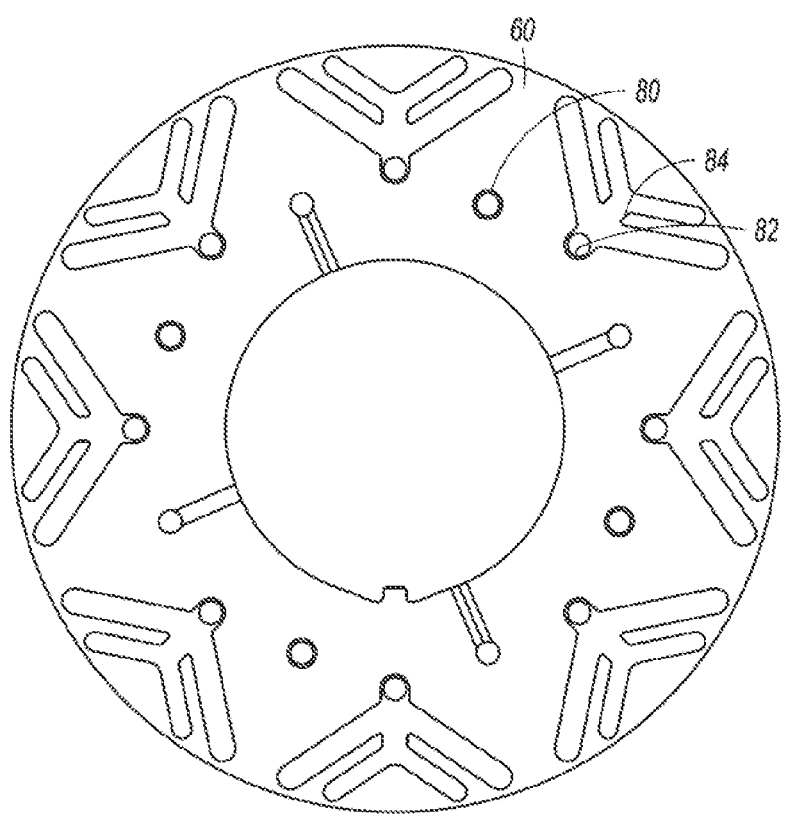
FIG. 6 is a plan view of an interior of an end ring of the core of the assembly of FIG. 1.
Figure 7:
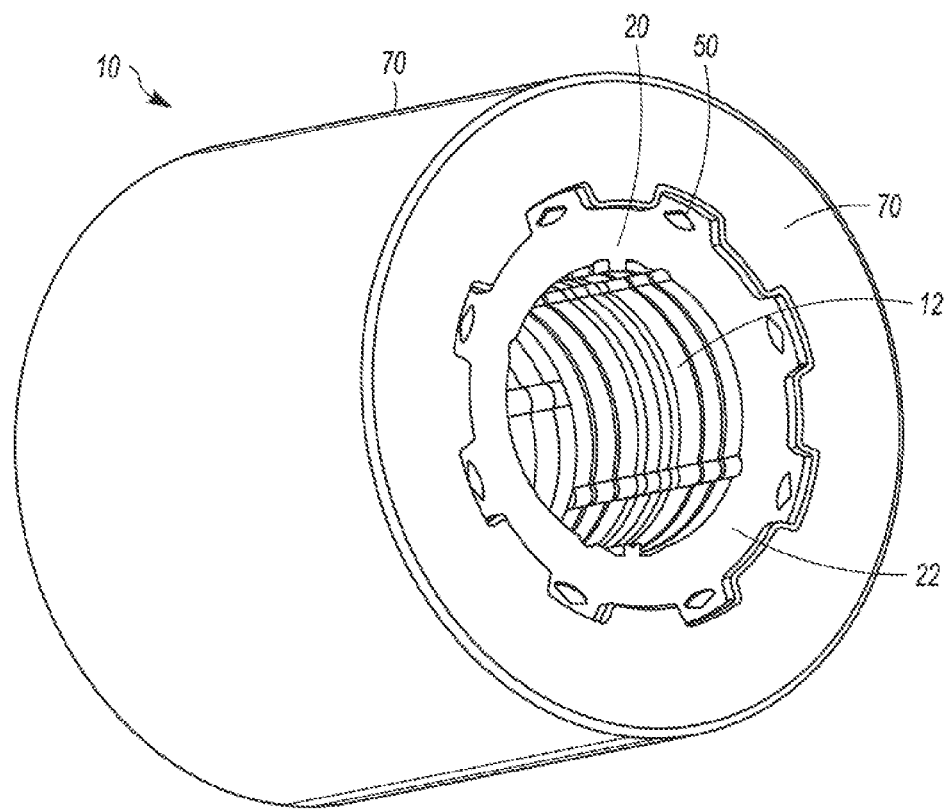
FIG. 7 is a perspective view of another rotor core in accordance with the present disclosure.

With reference to FIGS. 2, 5, and 6, the first and second end rings 60, 62 will now be described further. The first end ring 60 is at a first end of the plurality of laminations 20, and the second end ring 62 is at a second end of the plurality of laminations 20. The first and second end rings 60, 62 may be secured to the laminations 20 in any suitable manner. For example and as illustrated in FIGS. 2 and 5, the first and second end rings 60, 62 may be secured with the rods 52 and the retention members 54. Alternatively, the first and second end rings 60, 62 may be secured with any suitable adhesive. The material used to adhere the first and second end rings 60, 62 to the laminations 20 may be similar to, or the same as, the polymeric coatings 70, 72. The first and second end rings 60, 62 may be made of any suitable metallic or polymeric material.

With particular reference to FIG. 6, the first end ring 60 will now be described in additional detail. The second end ring 62 is the same as, or substantially similar to, the first end ring 60. Thus, the description of the first end ring 60 also applies to the second end ring 62. The first end ring 60 defines a plurality of rod bores 80 extending therethrough. The rod bores 80 accommodate the reinforcing rods 52 and the retention members 54. The first end ring 60 further defines a plurality of polymer inlets 82 and a plurality of polymer manifolds 84. The polymer inlets 82 extend through the first end ring 60 into cooperation with the polymer manifolds 84, which are at an inner surface of the first end ring 60. The polymer manifolds 84 are sized and shaped to correspond to the magnet slots 40 illustrated in FIG. 3. Thus, when the first end ring 60 is mounted to the outer lamination 20, the polymer manifolds 84 align with the magnet slots 40.

As a result, a polymer injected through the polymer inlets 82 will flow into the polymer manifolds 84, which are configured to direct the polymer into the magnet slots 40 adjacent to the magnets 42. The polymer manifolds 84 may also be sized and shaped to correspond to the reinforcing bores 50. Thus, when the first end ring 60 is mounted to the outer lamination 20, the polymer manifolds 84 align with the magnet slots 40, the reinforcing bores 50, or both the magnet slots 40 and the reinforcing bores 50 to direct polymer into the magnet slots 40 and/or the reinforcing bores 50.

With reference to FIGS. 3 and 4, the magnets 42 do not entirely fill the magnet slots 40. Thus, gaps are defined in the magnet slots 40, such as on opposite sides of the magnets 42, for example. The gaps may be filled with any suitable polymer to strengthen the core 12 and resist the compression forces applied to the laminations 20 by the carbon fiber sleeve 14. The polymer may be introduced into the gaps by way of the polymer inlets 82 and the polymer manifolds 84 of the first end ring 60 (as well as the second end ring 62). Any suitable polymer may be used, such as a polymer including any of the properties of the outer and inner polymeric coatings 70, 72 described above.

Figure 11:
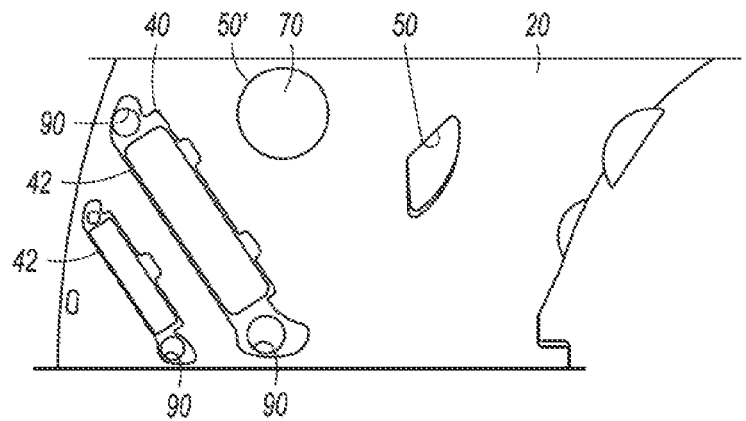
FIG. 11 illustrates magnet slots and magnets of the rotor core of FIG. 7.

The polymer may be applied in a manner to define cooling channels extending through the core 12, such as the cooling channels 90 illustrated in FIG. 11. Coolant may be introduced into the cooling channels 90 by a coolant manifold defined by the first end ring 60, or in any other suitable manner. Forming the channels 90 in the polymeric material places the channels 90 near a source of heat without disrupting magnetic flux paths. The polymer may also be applied more broadly on interior surfaces of the first end ring 60 and the second end ring 62 to secure the first and second end rings 60, 62 to the adjacent laminations 20. The interior surfaces of the first end ring 60 and the second end ring 62 may include any suitable primer for the polymer, such Alodine® offered by Henkel Corporation.

Figure 8:
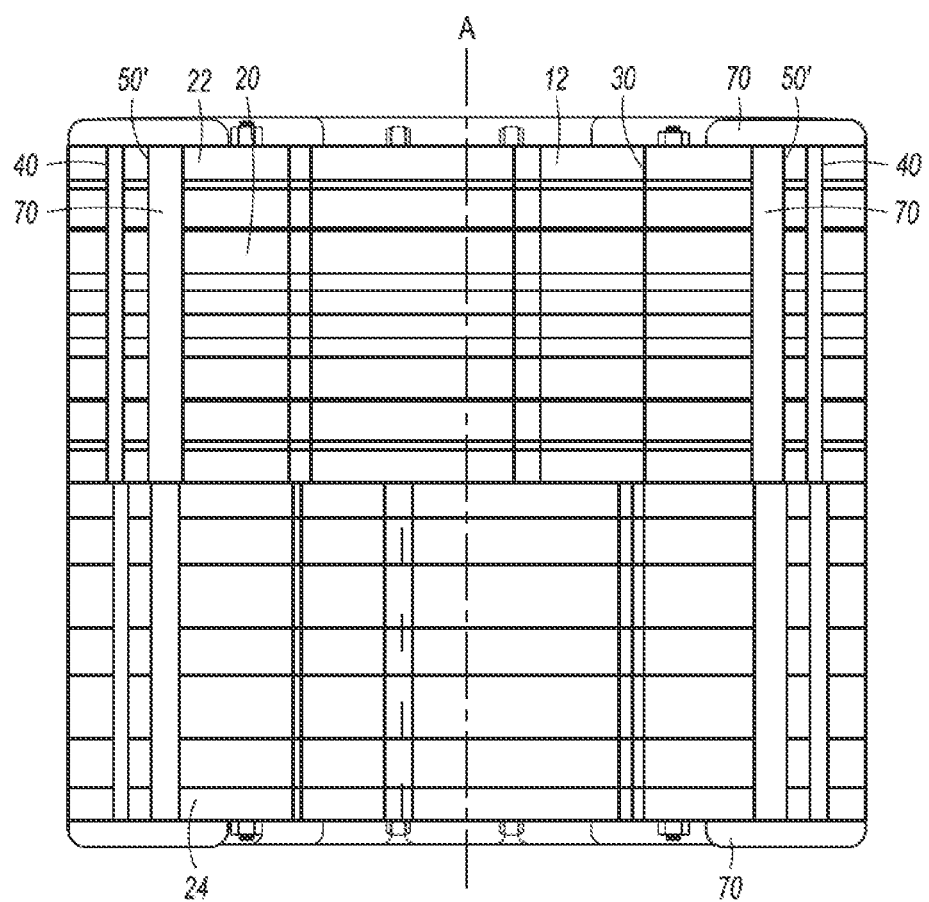
FIG. 8 is a cross-sectional view of FIG. 7.
Figure 9:
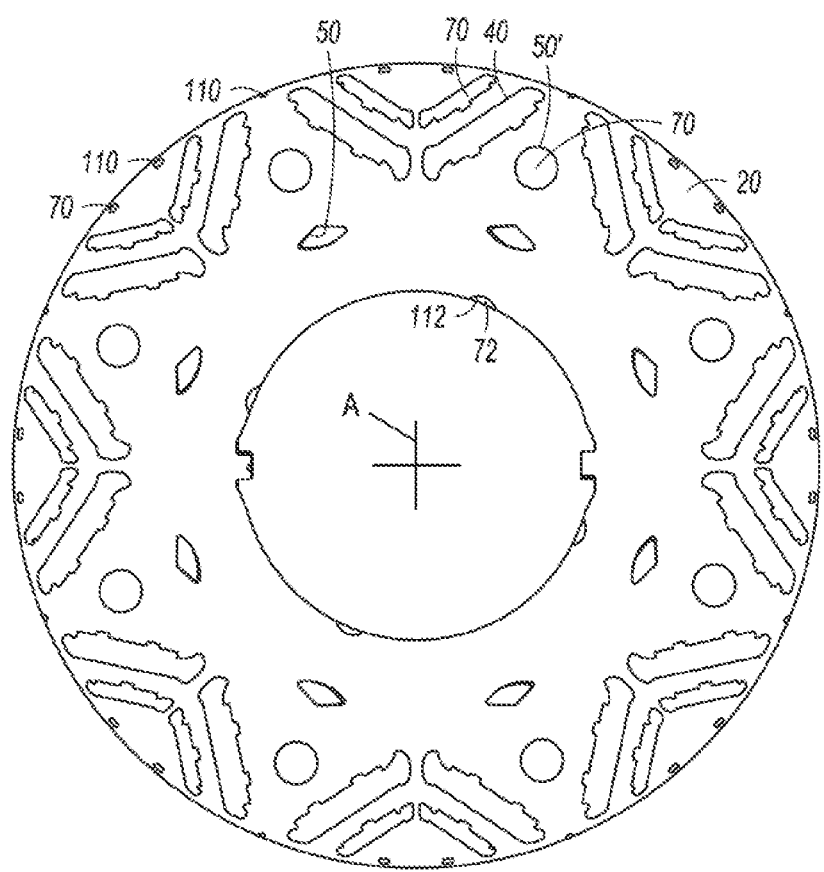
FIG. 9 is a cross-sectional view of FIG. 7 of a lamination of the rotor core of FIG. 7.
Figure 10:
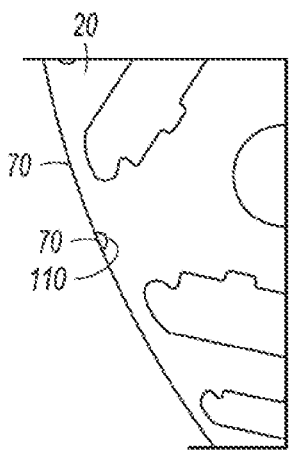
FIG. 10 is a plan view of an edge area of the lamination of FIG. 9.

With reference to FIGS. 7-11, the rotor core assembly 10 may be configured to not include the first end ring 60 and the second end ring 62. In the exemplary configuration of FIGS. 7-11, the outer polymeric coating 70 is molded onto a first lamination 22 at a first end of the core 12 to overlap a face of the first lamination 22. The outer polymeric coating 70 is molded into reinforcing bores 50'. With particular reference to FIG. 8, the outer polymeric coating 70 may be injected into the reinforcing bores 50' and configured with sufficient strength to act as a reinforcing member to stabilize the core 12 and resist compression force from the carbon fiber sleeve 14. The outer polymeric coating 70 may also be applied such that it flows into the magnet slots 40 into gaps adjacent to the magnets 42, as illustrated in FIG. 11 for example along with the cooling channels 90. The outer polymeric coating 70 is similarly molded onto a second lamination 24 at a second end of the core 12. In the configuration of FIGS. 7-13, the bores 50 may be configured as open cooling channels, or may include the rods 52.

With reference to FIGS. 9-13, for example, the laminations 20 also define outer slots 110 and inner slots 112, which in some applications are configured to reduce noise, vibration, and harshness (NVH) that may be generated by rotation of the core 12. In the configuration illustrated, the outer slots 110 are filled with the outer polymeric coating 70, and the inner slots 112 are filled with the inner polymeric coating 72, which further strengthens the laminations 20 and the overall core 12 to resist compression forces from the carbon fiber sleeve 14.

The outer polymeric coating 70 and the inner polymeric coating 72 may be textured to facilitate lubrication and reduce friction. For example, small (1-100 μm) bumps or ridges may be formed in the polymeric coatings 70, 72 in straight or helical patterns. The carbon fiber sleeve 14 may be rotated as it is press-fit onto the outer polymeric coating 70—the helical patterns are configured to facilitate such rotation.

Figure 12:
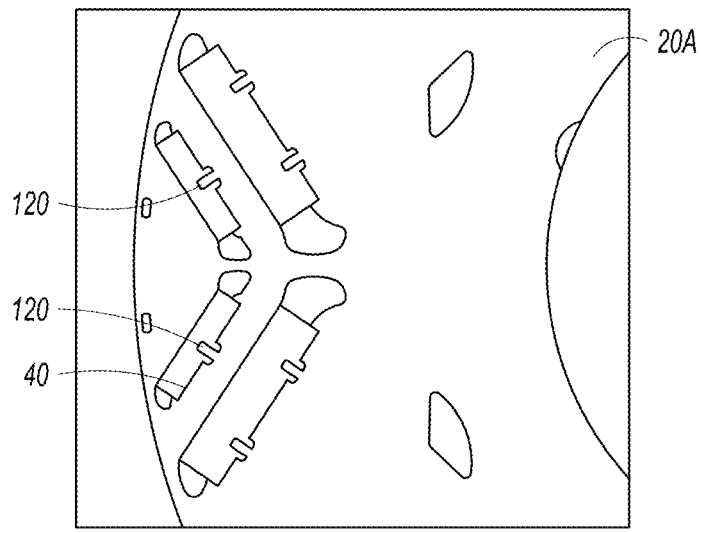
FIG. 12 illustrates tabbed magnet slots of the rotor core of FIG. 7.
Figure 13:
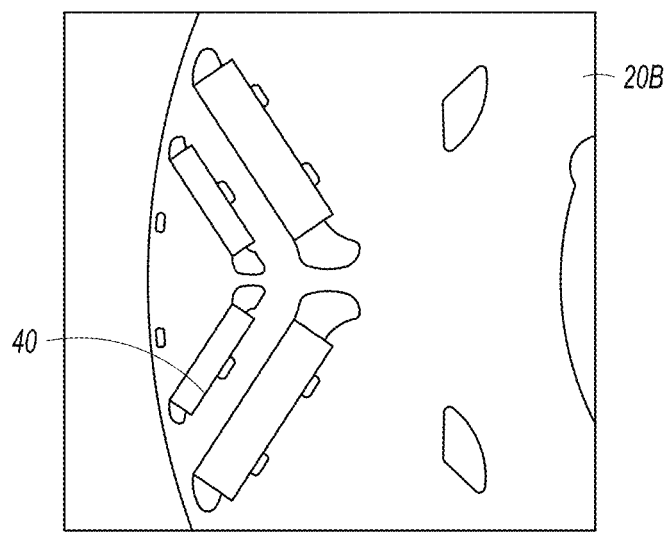
FIG. 13 illustrates tabless magnet slots of the rotor core of FIG. 7.

With reference to FIGS. 12 and 13, the plurality of laminations 20 include tabbed laminations 20A (FIG. 12) and laminations without tabs 20B. The tabbed laminations 20A include tabs 120 in the magnet slots 40. The laminations 20B include magnet slots 40 without tabs (and thus the laminations 20B are "tabless"). The tabbed laminations 20A and the tabless laminations 20B alternate along the core 12. The tabs 120 are bent or folded over the tabless laminations 20B to further stabilize and strengthen the core 12.

The features illustrated throughout the figures are interchangeable with the various disclosed configurations. For example, features of FIGS. 7-13 may be incorporated into the configurations of FIGS. 1-6. Likewise, features of FIGS. 1-6 may be incorporated into the configurations of FIGS. 7-13.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A rotor core assembly for an electric motor, the rotor core assembly comprising:
   a plurality of laminations secured together;
   a center bore defined by the plurality of laminations, a longitudinal axis of the rotor core assembly extends along an axial center of the center bore;
   a carbon fiber sleeve surrounding the plurality of laminations;
   an outer polymeric coating on outer surfaces of the plurality of laminations between the plurality of laminations and the carbon fiber sleeve;
   magnet slots defined by the plurality of laminations, the magnet slots extending parallel to the longitudinal axis;
   magnets seated in the magnet slots;
   reinforcing bores defined by, and extending across, the plurality of laminations; and
   reinforcing members seated in the reinforcing bores.

2. The rotor core assembly of claim 1, wherein the reinforcing members include rods mounted with retention members at opposite ends thereof to compress the plurality of laminations together.

3. The rotor core assembly of claim 1, wherein the reinforcing members include strips of polymeric material extending through the reinforcing bores.

4. The rotor core assembly of claim 1, wherein the magnet slots include a polymeric filler.

5. The rotor core assembly of claim 4, further comprising a first end ring and a second end ring, the plurality of laminations are between the first end ring and the second end ring.

6. The rotor core assembly of claim 5, wherein at least one of the first end ring and the second end ring defines an inlet and a manifold extending from the inlet, the manifold configured to direct the polymeric filler from the inlet into at least one of the magnet slots and the reinforcing bores.

7. The rotor core assembly of claim 6, wherein the manifold of the first end ring is configured to direct the polymeric filler to between the first end ring and a first one of the plurality of laminations to bond the first end ring to the first one of the plurality of laminations.

8. The rotor core assembly of claim 4, wherein the polymeric filler at least partially covers a top one of the plurality of laminations and a bottom one of the plurality of laminations.

9. The rotor core assembly of claim 4, wherein the polymeric filler defines a cooling channel extending through the magnet slots.

10. The rotor core assembly of claim 1, wherein the outer polymeric coating extends into slots at the outer surfaces of the plurality of laminations.

11. The rotor core assembly of claim 1, further comprising an inner polymeric coating on inner surfaces of the plurality of laminations at the center bore.

12. The rotor core assembly of claim 11, wherein the inner polymeric coating extends into slots at the inner surfaces of the plurality of laminations.

13. The rotor core assembly of claim 1, wherein the plurality of laminations include alternating tabbed laminations and tabless laminations, the tabbed laminations include tabs at at least one of the magnet slots and the center bore that are folded over the tabless laminations.

14. A rotor core assembly for an electric motor, the rotor core assembly comprising:

a plurality of laminations secured together;
a center bore defined by the plurality of laminations, a longitudinal axis of the rotor core assembly extends along an axial center of the center bore;
a carbon fiber sleeve surrounding the plurality of laminations;
magnet slots defined by the plurality of laminations, the magnet slots extending parallel to the longitudinal axis;
magnets seated in the magnet slots;
a polymeric filler within the magnet slots adjacent to the magnets;
an outer polymeric coating on outer surfaces of the plurality of laminations between the plurality of laminations and the carbon fiber sleeve; and
an inner polymeric coating on inner surfaces of the plurality of laminations at the center bore.

15. The rotor core assembly of claim 14, further comprising:
a first end ring and a second end ring, the plurality of laminations are between the first end ring and the second end ring;
wherein at least one of the first end ring and the second end ring defines an inlet and a manifold extending from the inlet, the manifold configured to direct the polymeric filler from the inlet into the magnet slots.

16. The rotor core assembly of claim 14, further comprising:
reinforcing bores defined by, and extending through, the plurality of laminations; and
reinforcing members seated in the reinforcing bores.

17. The rotor core assembly of claim 16, wherein the reinforcing members include reinforcing rods, and the reinforcing bores are connected to the magnet slots.

18. A rotor core assembly for an electric motor, the rotor core assembly comprising:
a plurality of laminations secured together;
a first end ring and a second end ring, the plurality of laminations are between the first end ring and the second end ring;
reinforcing bores defined by, and extending through, the plurality of laminations;
reinforcing members seated in the reinforcing bores;
a center bore defined by the plurality of laminations, a longitudinal axis of the rotor core assembly extends along an axial center of the center bore;
a carbon fiber sleeve surrounding the plurality of laminations;
magnet slots defined by the plurality of laminations, the magnet slots extending parallel to the longitudinal axis;
magnets seated in the magnet slots;
a polymeric filler within the magnet slots adjacent to the magnets;
an outer polymeric coating on outer surfaces of the plurality of laminations between the plurality of laminations and the carbon fiber sleeve; and
an inner polymeric coating on inner surfaces of the plurality of laminations at the center bore;
wherein at least one of the first end ring and the second end ring defines an inlet and a manifold extending from the inlet, the manifold configured to direct the polymeric filler from the inlet into the magnet slots.

19. The rotor core assembly of claim 18, wherein the reinforcing members are rods fastened to the first end ring and the second end ring.

* * * * *